United States Patent [19]
Garfinkle

[11] Patent Number: 5,213,422
[45] Date of Patent: May 25, 1993

[54] BICAMERAL PICTOGRAPHIC-LANGUAGE KEYBOARD

[76] Inventor: Moishe Garfinkle, P.O. Box 15855, Philadelphia, Pa. 19103

[21] Appl. No.: 881,623

[22] Filed: May 12, 1992

Related U.S. Application Data

[63] Continuation-in-part of Ser. No. 508,972, Apr. 13, 1990, abandoned.

[51] Int. Cl.$^5$ ............................................. B41J 3/01
[52] U.S. Cl. .................................... 400/109; 400/110; 400/484; 400/477; 400/485; 400/712; 400/86; 400/491.3; 341/28
[58] Field of Search ............... 400/477, 484, 485, 489, 400/109, 110, 712, 86, 87, 491.3; 341/711, 712, 21, 22, 27, 28; 340/365 R; 364/419

[56] References Cited

U.S. PATENT DOCUMENTS

| | | | |
|---|---|---|---|
| 3,822,776 | 7/1974 | Pratt | 400/491.3 |
| 4,379,288 | 4/1983 | Leung et al. | 341/28 |
| 4,694,725 | 9/1974 | Seevers et al. | 341/27 |
| 4,775,255 | 10/1988 | Langley | 400/100 |

FOREIGN PATENT DOCUMENTS 2142455  1/1985  United Kingdom ............... 400/110

Primary Examiner—Edgar S. Burr
Assistant Examiner—Lynn D. Hendrickson

[57] ABSTRACT

A Bicameral Keyboard is provided for generating pictographic characters wherein twenty keys are sufficient to specify the roughly 3000 characters required for ordinary personal and business correspondence. The Bicameral Keyboard is compatible with pictographic expression and pedagogy and will permit direct access to word processors, translation machines, page editors, and printers at input rates more rapid than possible using the alphanumeric keyboard with western orthographic characters.

2 Claims, 2 Drawing Sheets

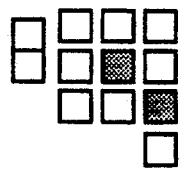 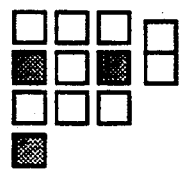  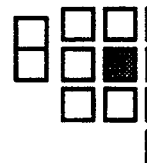 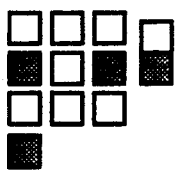

| Register | Decimal Notation | Binary Notation |
|---|---|---|
| 11 | $2^4$ | 0000000000010000 |
| 12 | $2^8$ | 0000000100000000 |
| 10 | Left-Keypad Word | 0000000100010000 |

*Fig. 4B*

| Register | Decimal Notation | Binary Notation |
|---|---|---|
| 21 | $2^3$ | 0000000000001000 |
| 22 | $2^5$ | 0000000000100000 |
| 20 | Right-Keypad Word | 0000000000101000 |

*Fig. 4C*

| Register | Decimal Notation | Binary Notation |
|---|---|---|
| 31 | 0 | 0000000000000000 |
| 32 | 0 | 0000000000000000 |
| 33 | 0 | 0000000000000000 |
| 34 | Left-Keypad Word | 0000000100010000 |
| 30 | $CS_L$ | 0000000100010000 |

*Fig. 4D*

| Register | Decimal Notation | Binary Notation |
|---|---|---|
| 41 | 0 | 0000000000000000 |
| 42 | 0 | 0000000000000000 |
| 43 | $2^9$ | 0000001000000000 |
| 44 | Right-Keypad Word | 0000000000101000 |
| 40 | $CS_R$ | 0000001000101000 |

*Fig. 4E*

| Register | Decimal Notation | Binary Notation |
|---|---|---|
| 41 | 0 | 0000000000000000 |
| 42 | $2^{10}$ | 0000010000000000 |
| 43 | $2^9$ | 0000001000000000 |
| 44 | Right-Keypad Word | 0000000000101000 |
| 40 | $CS_R$ | 0000011000101000 |

BICAMERAL PICTOGRAPHIC-LANGUAGE KEYBOARD

This application is a continuation-in-part of Ser. No. 07/508,972, filed Apr. 13, 1990 involuntarily abandoned.

FIELD OF THE INVENTION

This invention relates to a bicameral keyboard for computer generation of pictographic characters suitable for word processing, display monitors or printers.

BACKGROUND OF THE INVENTION

Written languages based on the evolved Chinese pictographic system, specifically modern Chinese, Japanese, Vietnamese, and Korean, have certain intrinsic difficulties not only chronically in terms of learning rate, but more recently in terms of technological utilization. There are some fifty thousand chinese characters, each capable of representing either a word, a syllable, or some combination thereof. The vast majority defy any rational classification relating character linestroke composition to meaning, and even the remainder tax the skills of any taxonomist attracted to this field of research.

Only some 12,000 Chinese characters have been adequately classified for lexicographical purposes. Consequently, it is not surprising that many attempts have been made to adopt the orthographic system common to the West to replace the present pictographic system. However, because of the considerable cultural content of pictographic expression, these attempts have met with considerable resistance. Accordingly, it can safely be assumed that the present system will remain in place for the foreseeable future. This being the situation, it is indeed fortunate that only some three thousand Chinese characters are required for ordinary correspondence.

The only method of learning the 3000 or so characters required in ordinary writing is by memorizing each individual character, character by character. Although the sheer memory work required to master reading is a prodigious task in itself, it is further complicated by the exceptional calligraphic skills required to master written Chinese. As these two tasks are taught together: recognition and reproduction, the more difficulty acquired skill tends to slow the overall rate of learning.

While young children have surprisingly acute sound and symbol recognition skills, as evident from their ability to learn not only their native language but foreign languages almost from infancy, the adequate motor functions required for writing are not generally developed until later. Hence, if both skills are taught together, writing requirements tend to retard reading progress.

For the pictographic languages students must learn not only to recognize the various characters and commit to memory their assigned meaning, but must master the calligraphic skill of manually representing the characters. Each character comprises a series of linestrokes, generally between 7 and 15, but can range up to 36. Because the differences between characters can be very subtle, students must cope with exacting linestroke type, relative size and position, and linestroke intersection.

Considering the number of linestrokes required for a single character, learning the virtually unlimited number of Chinese characters is quite slow in comparison to comparable learning rates in the West with its limited number of orthographic characters each rarely requiring more than two linestrokes. Understandably, it generally takes roughly six years for students to master some 3000 characters at the rate of 500 to 600 each year.

As a consequence, mastering Chinese character reading and writing is slow. This is not necessarily because it depends on sheer memory power to master reading and exceptional calligraphic skills to master writing, but because these two skills are combined in learning the written language.

Another problem relating to the sheer number of Chinese characters is that they do not lend themselves to practical keyboard representation as required for technological utilization such as for commercial correspondence and business reports and particularly for newspaper and magazine composition at speeds necessary for mass distribution requirements.

Cumbersome typewriters have been developed with extended keyboards, some with several hundred keys to represent the most frequently occurring characters, but because of the large number of less common but still ordinarily required characters, even the largest of such mechanical devices require open keys onto which individual type from a nearby font can be manually secured. Nevertheless, because individual characters generally represent whole words rather than syllables, practical printing speeds comparable to alphanumeric typewriters have been achieved. However, such mechanical contrivances have reached their limit and of course were never suitable to a modern business office.

With the development of electronic typewriters and typesetters with word-processing capabilities, it would appear that some electronic scheme would appear to alleviate this problem, but this has not been the case. The fundamental problem remains: before electronic reproduction of the correct character, whether pictographic or orthographic, the character identification must be entered into the machine.

Because of the limited number of orthographic characters used in the West, rarely exceeding fifty, the simple manual alphanumeric keyboard arrangement is practical for computer keyboards. Consequently, Westerners are not only familiar with the alphanumeric keyboard, but contend that such a keyboard arrangement, or variations on it, are suitable for all other language and all other cultures.

Accordingly, all such schemes known to the applicant for entering Chinese characters on an electronic keyboard involve rearrangements and modifications of the Western alphanumeric keyboard. In this regard all such schemes are incompatible with pictographic language with its essentially unlimited number of characters because each alphanumeric key has an assigned character or combination of characters. Not surprisingly, all such keyboards, being based on Western alphabetic concepts, have failed in some measure.

Wang proposes a keyboard in which the pictographic characters are constructed from radical and phonetic elements, several such elements assigned to each key of an essentially western keyboard, with the shift key used for final selection.

Barnea et al proposes a keyboard in which the pictographic characters are constructed from line-strokes, several such line-strokes assigned to each key of an essentially western keyboard, with the shift key used for final selection.

Gornati proposes a keyboard in which the pictographic characters are constructed from sound and tone elements represented on keys grouped of keypads, each key and each keypad specifically identified by function.

Anadoliiski et al proposes a keyboard in which the pictographic characters are represented by hierarchical keypads to which specific priorities are assigned.

In each of these above examples the pedagogic discipline required in mastering pictographic language is significantly altered, limiting the practical application of these devices. Although Monroe et al proposes a means of electronic recognition of pictographic characters by identifiable constituents using a digitizing pad; essentially converting manually printed characters to electronic representations, the device operates no faster than the rate at which characters can be manually represented.

This limitation will remain as long as the Western alphanumeric keyboard is imposed upon those comfortable with pictographic expression and the sheer memory power required in mastering the Chinese characters. The objective of the present invention is an alternate keyboard arrangement compatible with pictographic expression and pedagogy, not with Western logic relating to proper alphanumeric keyboard arrangement.

SUMMARY OF THE INVENTION

A keyboard is provided for use in generating specific characters, and in particular pictographic characters, including a plurality of keypads, at least two keypads being spaced apart from each other and having multiple keys thereon.

In the preferred embodiment of this invention two separate keypads are provided, each of which includes multiple keys without character identification markings, and the actuation of a specific combination of keys on each of the two keypads specifies a particular character. Accordingly no single character is specific to any particular key, but to a combination of keys.

Most preferably the keyboard includes two keypads which are laterally spaced from each other and are mirror-image pairs, to thereby accommodate the physiological requirements of normal hand movement.

In the most preferred form of this invention each keypad of a mirror-image pair of keypads includes three horizontal rows of character keys, each row including three keys therein, thereby providing three columns. Thus, nine character keys preferably are provided on each of the two keypads employed to generate specific characters. Most preferably the keys are without character identification markings and the keys in the middle row on each of the two keypads are dimpled to tactually locate the position of the character keys. For ergonomic requirements the actuation of two keys on the same column is not required to specify a character.

Most preferably a means for generating a singular audible tone is provided after a specific combination of keys has been actuated for generating a character-identifier.

In a preferred form of this invention additional keys are provided adjacent to each of a pair of keypads to thereby increase the number of characters which can be specified, with these auxiliary keys themselves mirror-image pairs.

To increase the versatility of the keyboard a separate alphanumeric keyboard is disposed between laterally spaced apart keypads having character keys for generating a specific character.

In the most preferred form of this invention the number of keys on each of the keypads which need to be actuated for generating a specific character is identical. The same number of keys on each laterally displaced keypads are required to specify a particular character, and accordingly, the fingers of both hands are required to specify a particular character, with essentially the same number of fingers used on each hand.

Means are provided for generating a unique electronic signal for a specific character to be generated, upon the actuation of a specific combination of keys on each of at least two keypads having multiple keys. The actuation of a specific combination of keys on one keypad generates a binary-word character-specifier, and the actuation of a specific combination of keys on a second keypad generates another binary-word character-specifier, each character-specifier constituting part of a character-identifier comprising the character specifiers. The means for generating the unique character-identifier is independent of the actuation-rate or actuation-sequence of the combination of the keys actuated on each of the two keypads.

BRIEF DESCRIPTION OF DRAWINGS

FIG. 2A illustrates the specified keystrokes for a specified character.

FIG. 2B illustrates the specified keystrokes for another specified character.

FIG. 4A illustrates the 16-bit words held in the register of one of several accumulators.

FIG. 4B illustrates the 16-bit words held in the register of one of several accumulators.

FIG. 4C illustrates the 16-bit words held in the register of one of several accumulators.

FIG. 4D illustrates the 16-bit words held in the register of one of several accumulators.

FIG. 4E illustrates the 16-bit words held in the register of one of several accumulators.

Power switches and keys for word processing and other computer tasks are neither shown nor discussed as they are known to those skilled in the art.

DESCRIPTION OF THE PREFERRED EMBODIMENT

Figure 1:
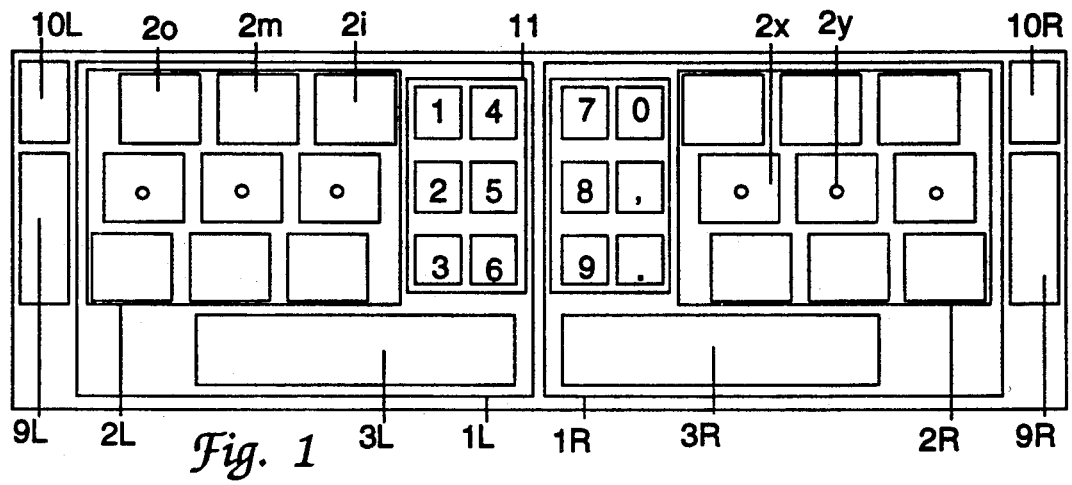
FIG. 1 illustrates the preferred key arrangement for a bicameral keyboard.

The Bicameral keyboard illustrated in FIG. 1 comprises laterally-disposed left keypad 1L and right keypad 1R, each with ten keys. The keypads 1L and 1R are essentially mirror-images of each other to accommodate normal hand movement, inasmuch as one hand is the mirror-image of the other hand. The nine character-keys 2L and 2R on each keypad 1L and 1R are arranged in a group comprising three essentially horizontal rows of three laterally disposed keys located above the thumb-keys 3L AND 3R to accommodate normal finger movement.

The inner three character-keys 2i of each keypad 1L and 1R are actuated by the index fingers (Digitus Secundus), the middle three character-keys 2m by the middle fingers (Digitus Medius), and the outer three character-keys 2o by the ring fingers (Digitus Annularis) of the right and left hands. The simultaneous depression of any two pairs of character-keys, two keys each 2L and 2R on each keypad 1L and 1R, generates a discrete signal comprising two 16-bit words specifying one character.

There are ostensibly 36 unique key-pair combinations on each keypad 1L and 1R, or with both keypads together provisions for 1,296 characters. However, because any key-pair combination with two character-keys on each keypad in the same lateral position $2i$, $2m$ or $2o$ (i.e. essentially vertically aligned columns), is ergonomically impractical as fingers would interfere with each other, there are effectively only 27 allowable combinations on each keypad for a total of 729 combinations. Therefore, 729 characters can be uniquely specified using four character-keys alone: two character-keys 2L on keypad 1L and two character-keys 2R on on keypad 1R.

The lower two keys 3L and 3R on keypads 1L and 1R are actuated by the thumbs (Pollex), and depending on the four on-off combinations of thumb-key actuation possible, there are altogether 2,916 (4×729) characters that can be uniquely specified. Accordingly, with just 18 character-keys and two thumb-keys a sufficient number of characters can be specified for ordinary personal and business correspondence.

However, the bicameral nature of the keyboard ostensibly presents a problem. It is not physiologically possible to normally conduct two separate manual tasks simultaneously that involve non-continuous or non-repetitive operations. This is particularly true of finger movement. Consequently, the keyboard operator: whether a student, a secretary, a technician, or a novelist; concentrating on a thought, a manuscript text, or dictation, and although cognizant of the proper key combination for the next character, cannot actuate the four required keys simultaneously. Therefore, depending on the operators propensity, the keys of both the right or left keypad will be depressed in some random order, ostensibly producing an error.

It is for this reason that the number of character-keys 2L and 2R to be actuated for each character is held to a fixed number: two on each keypad 1L and 1R. Only when two pair of character-keys are depressed, regardless of actuation-sequence or actuation-rate, is a proper signal produced corresponding to the selected character, with the thumb-keys 3L and 3R, if required, always actuated prior to the character-keys. A low singular momentary tone sounded after any four character-keys are actuated would permit the operator to move rapidly to the next character. This would aid in establishing a typing cadence.

To aid in maintaining this cadence, the middle transverse row of keys $2x$ on each keypad is denoted the index keys. The index keys $2x$ are dimpled $2y$ at their centers to tactually distinguish these from the other keys. Because only two fingers are moved at any one time, at least one finger is always in contact with an index key $2x$ on each keypad to locate the position of the other keys.

FIG. 2A illustrates a possible keystroke combination that might be specified to generate the character shown. Evidently, the governmental authority that assumes the responsibility of assigning the keystroke combinations for each character must have plenary jurisdiction in this respect for the combinations finally chosen after exhaustive consideration must be the best possible arrangement as they must be set for all time.

Each key of the Bicameral Keyboard is in either one of two possible states in binary code: OFF (0) or ON (1). Upon actuation of any character-key a momentary (1) electronic signal is produced.

Figure 3:
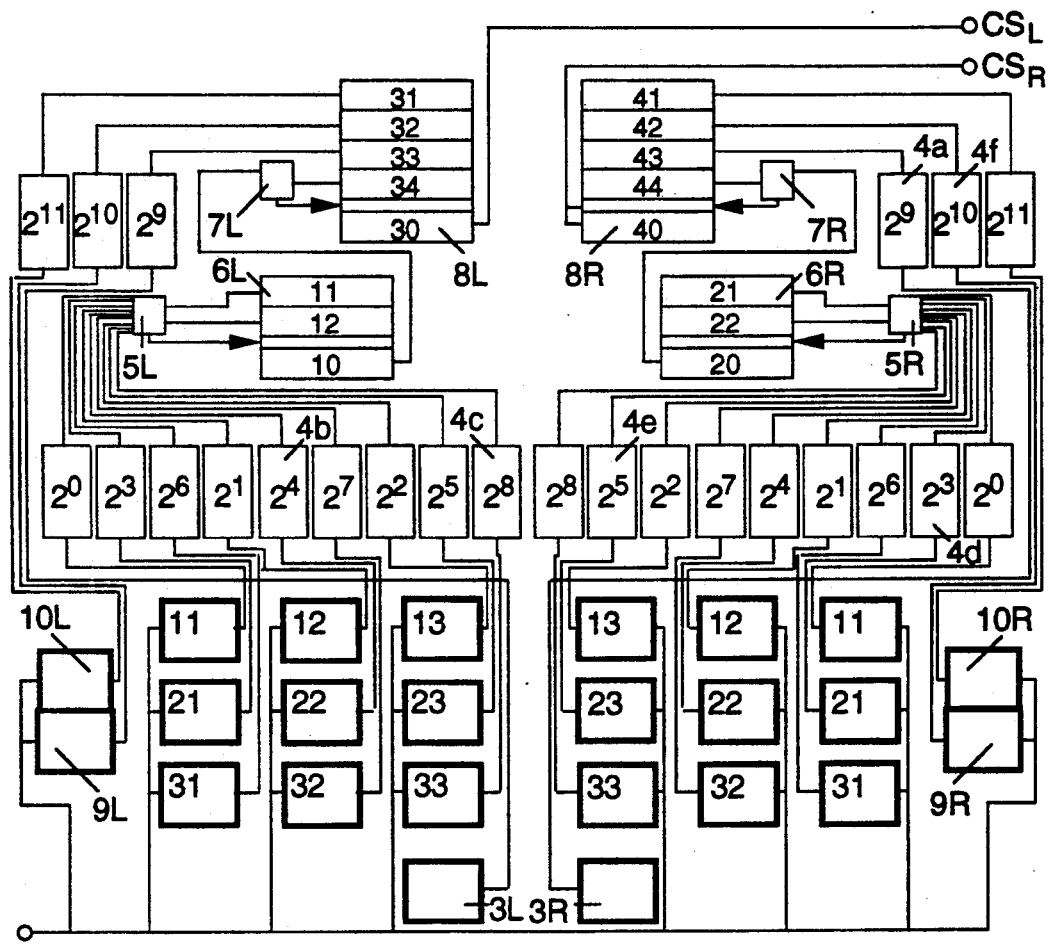
FIG. 3A is a schematic diagram of the character-specifier generators.

There are several ways to format the key combinations to generate an electronic Character Identifier CI, each specific to each character. FIG. 3 illustrates one of the least complex and most adaptable to pictograph classification. The discrete electronic signal generated for each character specified comprises a pair of 16-bit binary words denoted the Left Character Specifier ($CS_L$) generated by keypad 1L and the Right Character Specifier ($CS_R$) generated by keypad 1R. The character identifier CI comprising $CS_L$ and $CS_R$ for each character can be read by any appropriate device accessed by the Bicameral Keyboard. The matrix identifiers shown in FIG. 3 on each character-key appear only for instructive purposes, as the keys need not have any character identification markings. Each character-key 2L and 2R and each thumb-key 3L and 3R is assigned one binary code generator out of 24 available. Each generator outputs a 16-bit word represented by $2^n$, where $0 \leq n \leq 11$.

For example, consider the character illustrated in FIG. 2A with the keystrokes assigned to it. To specify this character on the Bicameral Keyboard requires actuation of the right thumb-key 3R prior to character-keys 2L and 2R being actuated. This generates the 16-bit binary word $2^9$ in binary-word generator $4a$ which is stored in register 43 of accumulator 8R as shown in FIGS. 3 and 4D.

Actuating character-keys [22] and [33] on the left keypad 1L generates binary words $2^4$ and $2^8$ respectively, in the binary word generators $4b$ and $4c$. The gate 5L sends the first word received to register (11) and the second word to register (12) of accumulator 6L, blocking any subsequent signals from left keypad 1L. These two 16-bit words are stored in registers (11) and (12) of accumulator 6L, as shown in FIGS. 2 and 4A. Only when both registers (11) and (12) contain non-zero words does the gate 5L allow the contents of registers (11) and (12) to be added together with the sum (termed the Left-Keypad Word) shown in register (10) of accumulator 6L.

Likewise, actuating character-keys [21] and [23] on the right keypad 1R generates binary words $2^3$ and $2^5$ respectively in the binary word generators $4d$ and $4e$. The gate 5R sends the first word received to register (21) and the second word to register (22) of accumulator 6R, blocking any subsequent signals from right keypad 1R. These two 16-bit words are stored in registers (21) and (22) of accumulator 6R, as shown in FIGS. 3 and 4B. Only when both registers (21) and (22) contain non-zero words does the gate 5R allow the contents of registers (21) and (22) to be added together with the sum, termed the Right-Keypad Word, shown in register (20) of accumulator 6R.

The left-keypad word from register (10) is sent to register (34) of accumulator 8L, as illustrated in FIGS. 3 and 4C. Only when register (34) contains a non-zero 16-bit word does gates 7L allow the contents of registers (31), (32), (33) and (34) to be added together, with the sum stored in register (30).

Likewise, the right-keypad word from register (20) is sent to register (44) of accumulator 8R, as illustrated in FIGS. 2 and 4D. Only when register (44) contains a non-zero 16-bit word does gates 7R allow the contents of registers (41), (42), (43) and (44) to be added together, with the sum stored in register (40).

Registers (30) and (40) hold the two 16-bit words $CS_L$ and $CS_R$ respectively that comprise the CI, and can be read by any appropriate device accessed by the Bicameral Keyboard. Subsequently all of the registers are reset in preparation for the next character.

Using a unique combination of two binary words $CS_L$ and $CS_R$ to specify each character significantly reduces the absolute number and size of the separate binary words required to accommodate the thousands of characters to be specified. Equally important, two words permits the characters to be classified using a compact matrix arrangement, which is particularly advantageous for pictographic languages.

Beyond the basic 2,916 characters required for ordinary correspondence there are perhaps triple this number that are sufficiently well defined to occasionally appear in business, political, and social correspondence. To accommodate these additional characters additional keys are provided. There are two shift-keys 9L and 9R on the Bicameral Keyboard. Shift-keys 9L and 9R are actuated by the little finger (Digitus Minimus) of each hand and increase the total number of characters capable of being specified by the Bicameral Keyboard to 11,664 (4×2,916), which cover essentially the full number of characters that have been commonly classified. Accordingly, the shift-keys accommodates characters beyond those required to be committed to memory by those literate in the Chinese language.

For example, to generate the character shown in FIG. 2B requires actuation of right shift-key 9R, which generates the binary word $2^{10}$, in the binary word generator 4f shown in FIG. 3. The sequence of events is the same as in the previous example except that both the right shift-key 9R and the right thumb-key 3R are actuated prior to the character-keys. As a result register (42) of accumulator 8R holds a non-zero 16-bit contribution to the $CS_R$, as illustrated in FIG. 4E. Essentially, this arrangement of twenty-two Bicameral Keyboard keys can accommodate the almost 12,000 characters which comprise the practical Chinese written language.

Two option-keys 10L and 10R are provided for the less common characters. These are located above the shift keys 9L and 9R respectively, and like the shift keys 9L and 9R are actuated by the little fingers (D. Minimus) of each hand. These option-keys 10L and 10R increase the total number of characters capable of being specified by the Bicameral Keyboard to 20,412, which cover essentially the full number of characters that may have future commercial and technical usefulness.

Essentially, the utility of the Bicameral Keyboard is limited only by the size of the font library available to the devices accessed by the Bicameral Keyboard. In this regard, without altering the Bicameral Keyboard or its circuitry the total number of characters that can be specified can be doubled to 40,824, useful to scholars for language analysis, simply by including simultaneous actuation of shift and option keys, but only if an immense font library is available.

Although electronic teaching aids have found favor in the West, they would be far more advantageous in teaching the pictographic languages. For example, a teaching program that electronically displays characters with the proper keystroke combination will permit the student to emulate the combination a sufficient number of times on the keyboard for retention.

Moreover, with the Bicameral Keyboard electronic teaching can significantly accelerate calligraphic skills after a certain character recognition proficiency is achieved. A character can be displayed and then by using a graphic tablet the student can attempt to reproduce the character using a stylus. Each stroke would be displayed in proper sequence with direction arrows, and the student would superimpose his stroke on the displayed stroke. Although such devices have been designed for teaching pictographic calligraphy, they rely on the alphanumeric keyboard. However, they would be far more compatible with the Bicameral Keyboard.

The Bicameral Keyboard arrangement illustrated in FIG. 1 shows center keypad 11. Using the four thumb-key combinations, keypad 11 provides 48 alphanumeric or special business characters that may be required in commercial correspondence. If necessary, the shift-keys and option-keys can significantly increase this number.

The great advantage of the Bicameral Keyboard is speed. It would be fast, at least as fast as the alphanumeric keyboard, and probably significantly faster because the same number of character-keys are required for any character. This permits a typing cadence to be established with virtually no hand shifting and comparably little finger movement because only two out three fingers are used in one any instance.

After the keystroke combinations have been specified by an appropriate authority, the Bicameral Keyboard will permit rapid access to word processors, page editors, displays and printers using Chinese characters. This objective can be achieved using the Bicameral Keyboard by coupling the reading skills required in Chinese character recognition with keystroke symbol recognition while relegating to a secondary level the vastly different and more exacting calligraphic skills required in manual character representation. In this manner the rate of character recognition can be significantly accelerated. Consequently, with the Bicameral Keyboard, subsequent mastery of calligraphy can be more readily achieved. Moreover, the Bicameral Keyboard will allow Chinese character recognition to be more readily mastered by Westerners.

While there have been described what is at present considered to be the preferred embodiment of a Bicameral Chinese-Character Keyboard, it will be obvious to those skilled in the art that various changes and modifications may be made therein without departing from the invention, and it is aimed therefore in the appended claims to cover all such changes and modifications as fall within the true spirit and scope of the invention.

I claim:

1. A bicameral keyboard for use in generating pictographic characters, said keyboard comprising
    two mirror-image keypads, each having a plurality of character keys for frequently used characters and additional mirror image keys for infrequently used characters, mean responsive to the actuation of a combination of said keys on each said keypad to specify a specific pictographic character;
    said additional mirror-image keys provided to increase the number of possible said pictographic characters specifiable by said character keys; and
    means to indicate that a character has been generated including
    means for generating an audible signal in response to the actuation of said additional mirror image keys and said character keys sufficient to specify a pictographic character.

2. A keyboard according to claim 1 wherein the actuation of said additional keys and said character keys sufficient to specify said pictographic character generates a unique electronic character identifier comprising a pair of binary words.

* * * * *